United States Patent

[11] 3,553,368

[72] Inventor Hans Rudolph
Munich-Solln, Germany
[21] Appl. No. 831,271
[22] Filed June 4, 1969
[45] Patented Jan. 5, 1971
[73] Assignee Siemens & Halske Aktiengesellschaft
Berlin and Munich, Germany
a corporation of Germany
[32] Priority Feb. 4, 1965
[33] Germany
[31] No. S95324
Continuation of application Ser. No. 524,265, Feb. 1, 1966, now abandoned.

[54] PHASE SHIFT KEYED TRANSMISSION OF DIBITS ENCODED TO ELIMINATE RECEIVER PHASE UNCERTAINTY

13 Claims, 6 Drawing Figs.

[52] U.S. Cl. .......... 178/67, 325/30, 325/163
[51] Int. Cl. .......... H04l 27/18, H04l 27/20
[50] Field of Search .......... 325/30, 163; 178/66, 67, 68; 340/347, (Inquired)

[56] References Cited
UNITED STATES PATENTS
3,128,343 4/1964 Baker .......... 178/67
3,131,363 4/1964 Landee et al. .......... 325/38X
3,378,637 4/1968 Kawai et al. .......... 178/67
3,412,206 11/1968 Bizet et al. .......... 178/67

*Primary Examiner*—Robert L. Griffin
*Assistant Examiner*—James A. Brodsky
*Attorney*—Hill, Sherman, Meroni, Gross and Simpson

ABSTRACT: A method and apparatus for transmission of a binary information signal comprising sequential digital signal steps consisting of binary states ("0," "1",) one of which represents a steady modulation condition of the binary information signal, by multistage phase modulation utilizing a plurality of determinate phase shifts of a carrier frequency in which a joint transmission is effected of respective binary sequences of "n" number (n being an integer greater than 1) of signal steps each different sequence group being transmitted as a group by a respective one of said determinate phase shifts, utilizing for the transmission of the binary information signal only the absolutely necessary number of $2^{n-1}$ phase shifts, utilizing an additional phase shift to transmit as a group, the fixed number of n signal steps of the binary state representing such steady modulation condition of the binary information signal, and transmitting any signal steps which number less than n, separating two successive groups, without a change in phase (0° phase shift) as a continuation of the immediately preceding phase position.

INVENTOR
Hans Rudolph

BY [signature]

ATTYS.

INVENTOR
*Hans Rudolph*

BY *Shiee & Shiee*
ATTYS.

INVENTOR
Hans Rudolph

BY Hiee & Hiee
ATTYS.

PHASE SHIFT KEYED TRANSMISSION OF DIBITS ENCODED TO ELIMINATE RECEIVER PHASE UNCERTAINTY

This is a streamlined continuation of Ser. No. 524,265, now abandoned.

The invention relates to a process for the transmission of binary signals in higher coded form by means of multistate phase modulation.

In the transmission of binary signals through a phase-modulated carrier frequency a fundamental drawback appears, in that the reception may be ambiguous. This leads, for example, in the case of a binary signal, to the result that the 0 state and the 1 state can be confused with one another. For the unambiguous demodulation of the signal on the reception side there would be necessary an auxiliary carrier frequency having a reference phase. While it is possible, in certain cases, especially in the transmission of binary signals through phase reversal modulation, to recover from the received carrier frequency signal an auxiliary carrier frequency, its phase position is indeterminate by 180°. This ambiguity likewise is transferred directly to the demodulated signal. In phase modulation with more than two states, the indeterminateness of the reception is increased correspondingly, so that, for example, in the case of quaternary phase modulation it is tetriguous. As is well known, this drawback can be avoided by use of phase differential modulation. Here, for example, in the case of binary modulation, the 0's are each marked by a phase change, and the 1's by no phase change (or vice versa). In the case of quaternary modulation, each two binary digits (bits) are expressed by a modulation process and, for example, the following designations may apply:

A phase change by +90° corresponds to the digit pair (dibit) 01 a phase change by −90° corresponds to the digit pair (dibit) 10;

a phase change by 180° corresponds to the digit pair (dibit) 00;and

"no phase change" corresponds to the digit pair (dibit) 11.

Phase differential modulation can be applied only in conjunction with rhythmic transmission, i.e., with transmission in a certain specific cyclic rate, as in longer intervals, without phase change, the number of 1's contained in it can be determined only from the number of cycles contained therein. Ordinarily, therefore, there is provided on the reception side a pulse generator, whose pulse frequency is synchronized as closely as possible with the transmission rhythm and which, synchronized with the signal reversals (phase shifts) of the received signal, maintains the correct rhythm even with omission or dropping out of signal reversals. In very long intervals without signal reversals hereinafter referred to as "steady" modulation or phase condition, of course, an error may arise, and if in the signals to be transmitted it is necessary to take into consideration such long intervals without signal reversals that the cumulative error may exceed an intolerable value, it is necessary to transmit from transmitter to receiver, in addition to the message signal, a timing signal as well.

A process for the transmission of additional timing signals in quaternary phase modulation is already known. It provides for adding to each phase shift in dibit rhythm an amount of +45°. Thereby, there results:

With a dibit 01,a phase shift by +90° +45° = 135°;

with a dibit 10,a phase shift by −90° +45° = −45°;

with a dibit 00,a phase shift by 180° +45° = −135°; and with a dibit 11,a phase shift by 0° +45° = +45°.

All the phase positions here occurring differ, as before, by 90° or 180°, so that the distinguishability of the states is not impaired by the addition of +45°. Of practical significance in the demodulation, however, is only the amount of shift or the speed of the shift of the phase. The phase shifts, generally abrupt on the transmitting side, are flattened by the frequency band limits in the transmission channel, which situation is highly disadvantageous as the speed of shift in the case of a 45° shift, as compared to the speed of shift in the case of a 135° shift, is considerably smaller in comparison to the ratio of the amounts of shift (about one-tenth as compared to one-third). The accuracy of the reception consequently is thereby appreciably impaired.

In the transmission of binary signals by means of ternary phase modulation, it is also known to additionally transmit beat or timing information data. This is accomplished by the method of marking each 0 bit by a positive and each 1 bit by a negative 120° phase shift of the carrier oscillation. A continuous beat or timing pulse is derived by rectification of the positive and negative pulses formed in the demodulation from the phase shifts.

It will be apparent that while the transmission of individual binary steps requires only two conditions or phase positions, one corresponding to the signal current condition and the other to the spacing current condition, when more than one signal step are transmitted as a group, the respective groups may comprise different combinations of individual steps, and each different group would require a respective phase shift to identify the same, whereby a minimum number of phase shifts (not including no-phase shift, i.e., 0°) is required for the transmission of the respective groups. From a mathematical consideration, such minimum number may be represented by the expression $2^{n}-^{1}$, wherein $n$ is an integer equal to the number of binary steps in each group and thus greater than 1. For example, where $n$=2, the expression $2^{n}-^{1}$ equals 2. In such case, the possible combinations of two binary steps 00 and 01 may be transmitted by the two respective phase shifts and one or more binary steps 1 transmitted without phase shift, i.e., 0°. Thus the minimum number of phase shifts required in such case is 2.

Similarly, with $n$=3, the groups of three binary steps (tribits), for example 001, 011 and 000 would be transmitted by the minimum number of four respective phase shifts while one or more signal elements 1 are transmitted without phase shift, i.e., 0°.

Thus the expression $2^{n}-^{1}$ represents the minimum number of phase shifts absolutely necessary for transmittal of groups, each containing $n$ number of binary steps. However, in this case, as previously mentioned, a long interval without a phase change (a long series of the binary step 1) can take place resulting in a problem with respect to synchronization of transmitter and receiver, requiring some form of recognition and possible correction. The spacing current condition represented by a series of 1 steps may be termed the "steady modulation condition of the binary information signal."

In the following there is proposed according to the invention a method employing, for example, quaternary phase modulation, which does not have the above-mentioned drawbacks, and in which, besides the message information, there can also be transmitted timing information, without its being necessary to skip phase shifts of less than 90°.

According to the invention, this is achieved by a method in which the number of modulation phases is increased by 1 over the requirements 1 of $2^{n}-^{1}$, power necessary for the information transmission in which $n$ is an integer greater than 1, and the additional modulation phase thereby gained takes the place of the steady phase condition (no phase shift) at the characteristic points of time.

In such a quaternary phase modulation, besides the steady phase condition (no phase shift), all told, there are possible three distinguishable phase shifts, namely 90°180° and 270° (the latter identical with −90°). According to the proposal at hand of German Pat. No. 1,165,657, and corresponding British Pat. No. 1,030,194, published May 18, 1966, however, for the representation of a binary message in the next higher coded form, besides the static condition, two distinguishable modulation criteria are sufficient. If two of the phase shifts mentioned are so taken, the third then remains available for the transmission of the beat in periods in which no signal reversal would otherwise be present. The new proposal provides that there are transmitted, for example, a dibit 01by a phase shift of +90°, a dibit 00by a phase shift of −90°, a dibit 11 by a phase shift of 180°, with individual 1 bits occurring only inbetween through the steady phase condition (no phase shift).

The phase shifts of +90° or −90° contain a message information datum and simultaneously timing information. The phase changes of 180° preferably contain timing information which is redundant with contained message information. The time interval between two successive pieces of timing information corresponds to the duration of two or three steps of the binary signal, in which system greater intervals cannot occur without timing information.

The idea basic to the invention can also be applied to the transmission in a still higher coded form.

In a senary phase modulation, besides the static condition, five distinguishable phase shifts are possible. In each case three binary digits (bits) of a certain type are collected into a "tribit" and transmitted, for example, as follows:

A tribit 011 by a phase shift of +60°;
a tribit 001 by a phase shift of +120°;
a tribit 010 by a phase shift of −60°;
a tribit 000 by a phase shift of −120°; and
a tribit 111 by a phase shift of 180°.

Between these tribits there can occur only a single or two successive 1 bits, and these are transmitted by retention of the last set phase position (steady phase condition).

The phase changes of ±60° and ±120° here contain, besides message information, simultaneously timing information, and the phase shifts of 180° contain timing information with redundant message information. Pieces of timing information thus occur in the time interval of three, four or five steps of the binary signal.

Details of the invention are explained with the aid of advantageous examples of construction illustrated in the drawing, in which there are also included additional features according to the invention, and in which.

Figures 1, 2, 3:
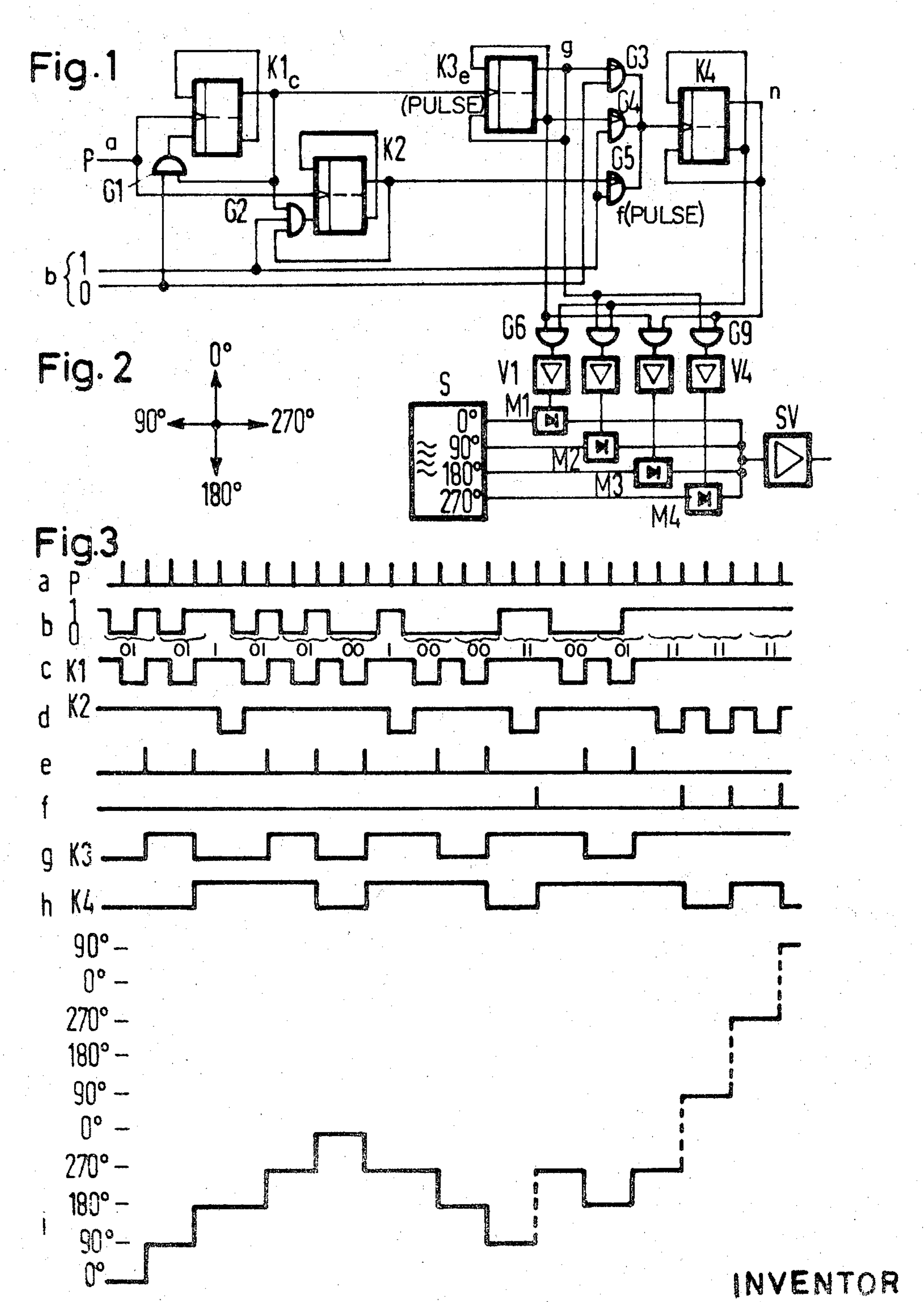
FIG. 1 represents a circuit arrangement embodying the invention and utilizing quaternary operation.
FIG. 2 represents a phase diagram for quaternary operation in the circuit of FIG. 1.
FIG. 3 is a chart illustrating the relationships existing in the operation of the circuit of FIG. 1.

To the transmitting system for quaternary operation (FIG. 1) there is supplied, on the one hand, over the input terminal P, pulses (according to line *a* of FIG. 3) at the element frequency of the binary signal to be transmitted, which controls the rhythmic course of the transmission. On the other hand, over the lines designated as 1 and 0, there is applied the binary signal (for example, according to line *b*, in FIG. 3) which, for example, should be of such a nature that with a 1 state on line 1 positive potential exists and on line 0 ground potential, while with 0 state, these potentials are interchanged. The individual pulses of P should fall approximately on the step centers of the binary signal.

The system contains, first of all, a bistable flip-flop circuit K1, which forms a twos-counter and in each case covers two successive steps, the first of which is an 0 step (dibit 01 or 00). On coincidence at gate G1, i.e. when in the binary signal 0 state is present and K1 lies "above" in rest position, the lower input of this flip-flop circuit receives preparation voltage and the next pulse from P puts it "below" in the working position, in which process the succeeding pulse of P flips the flip-flop circuit K1 directly into the rest position (*cf.* line *c* in FIG. 3). Each positive flank delivers a pulse (line *e*) which falls about on the middle of the second step of a dibit, and depending on the state (1 or 0) of this second step, in the final effect, the carrier frequency is shifted to an oscillation phase lying 90° ahead or behind.

A second flip-flop circuit K2 forms a similar twos-counter, which dependent upon coincidence at G2 starts on each 1 step not covered by a dibit 01, and after a beat interval of P returns again into the rest position (line *d*). Only if the upward-moving flip process coincides with the 1 state in the binary signal does there arise on the output of gate G5 a pulse (line *f*) which causes, in a subsequent portion of the system, a phase reversal of the carrier oscillation, i.e. a 180° phase shift.

The flip-flop circuits K3 and K4 form a four-stage forward-backward counter which, with reference to the outputs formed by the gates G6 to G9, has the properties of a ring counter. The output voltages alternately appearing at the outputs are amplified in the amplifiers V1 to V4 and in each case control one of the key modulators M1, M2, M3 or M4 for the passage of one of the four oscillation phases of the carrier generator S, in accordance with the phase diagram of FIG. 2. The four-stage counter is actuated at each pulse (line *e*) from K1, which coincides with the 1 state in the binary signal, one state forward, and on each pulse, which coincides with the 0 state, one stage backward. Each pulse (line *f*) passing over G5 changes the counter position by two stages. The course of the flipping processes in the two counter flip-flop circuits K3 and K4, in the binary signal, taking line *b* as an example, is represented in lines *g* and *h*, in which, in both flip-flop circuits, "down" was arbitrarily taken as a starting point. The carrier phases alternately switched through over M1 to M4 forming the transmitted signal, which is amplified as required in the transmitting amplifier SV and supplied to the transmission channel. Line *i* of FIG. 3 illustrates the phase shifts in the transmitted signal.

Reviewing the operation of the circuit of FIG. 1, with respect to the sequence of binary signals represented in line *b* of FIG. 3, it will be apparent that the dibits 01, 00 and 11, as well as the single 1 steps appear in the sequence 01, 01, 1, 01, 01, 00, 1, 00, 00, 11, 00, 01, 11, 11, 11, with a binary 1 being represented by positive potential on line 1 and ground potential on line 0 and a binary 0 being represented by a reversal of polarity with positive potential on line 0 and ground potential on line 1. Line *b* thus indicates the presence of positive potential on either line 1 or 0.

In correspondence to line *c*, *d*, *g* and *h* of FIG. 3, the "up" position of the circuits K1 and K2 will be considered their rest position and the "down" positions of circuits K3 and K4 will be taken as the initial positions *h* of FIG. 3. In this condition, positive voltage will appear at the output of K1(*c*) and on the associated lines to gates G1 and G2. At the same time positive voltage will be present from the one output of K3 on gates G6 and G8 and zero potential from the other output of K3 on gates G7 and G9. In like manner the one output of K4 will apply positive voltage to gates G6 and G7 while the opposite output will apply zero potential to gates G8 and G9. Consequently, gate G6 will be open, amplifier V1 operative, and key modulator M1 actuated whereby the output signal *i* will have zero phase.

Assuming a binary 0 is to be transmitted, positive potential will appear on 1, 0 and ground potential on line 1. Positive potential now being on both inputs of gate G1, the latter receives preparation voltage and the first pulse at P (line *a*, FIG. 3) will flip the flip-flop circuit K1 to its "lower" position, thereby placing ground potential at the input of K3 and the associated input of gate G1. The next step is a 1 and, consequently, positive potential will now appear on line 1 and ground potential on line 0, thereby placing ground potential on both inputs of gate G1. Upon receipt of the second pulse at P, K1 flips to its rest position with positive potential reappearing at point *c* and the positive flank producing a pulse *e* at the input of flip-flop circuit K3, causing the latter to flip.

With flipping of K3 positive potential is applied from the output of K3 to gates G7 and G9 and net ground potential upon gates G6 and G8 with the potentials on the other gates from K4 remaining unchanged. Gate G6 now is blocked while gate G7 receives positive potential at both inputs and thus is open whereby amplifier V2 and key modulator M2 are operative with the transmitted signal *i* having a phase shift of 90°.

As the two steps of the next dibit correspond with the first two steps thus far described, like operations will take place but in this case K3 and K4 will both be flipped to their working positions, i.e. K3 in "down" position and K4 in "up" position. Positive potentials now applied by the one output of K3 to gates 6 and 8 and by the one output of K4 to gates 8 and 9 with ground potential being applied to all other gate inputs, whereby gate G8 is open, amplifier V1 and key modulator M3 are operative to provide a transmitted signal which is shifted another 90°.

Referring to line *b* of FIG. 3, it will be noted that the next binary step is a 1 and that is followed by a 0, and thus represents an individual 1. If it were followed by another 1 it could be transmitted as a dibit 11 as is subsequently illustrated in line *b*. Consequently, in accordance with the method here involved, such individual 1 will be transmitted with no change in the previous phase, taking place as hereinafter described. Following actuation of the key modulator M3, positive potential exists at all three inputs of gate G2, K1 being in its upper left position and K2 likewise remaining in its rest position. As positive potential continues to lie on line 1 as a result of the next step also being a 1. Positive potential exists at all inputs of gate G2 when the fifth pulse appears at P (line *a*, FIG. 3), whereby such pulse will flip K2, K1 however remaining in its rest position as it has not been prepared through gate G1 as the latter has ground potential from line 0. Following this operation as the next step is a 0, the polarities of the lines 1 and 0 are reversed with the line 1 receiving ground potential and the line 0 receiving a positive potential so that K1 receives preparatory voltage through gate G1 and upon receipt of the sixth pulse at P both K1 and K2 are flipped, K1 to its working position and K2 to its rest position. No change will be made thereby in flip-flop circuits K3 or K4 and the phase of output signal *i* will remain at 180°.

The next two steps form a 01 dibit and the sequence of operations will be the same as previously described with respect to the first two dibits but at the end of such operation, K3 will be in its "upper" working position while K4 will likewise be in its working position. This condition will result in positive potential being applied from the one output of K3 to gates G7 and G9 and positive potential from the corresponding output of K4 to gates G8 and G9, with ground potential appearing at the remaining gate inputs, and as gate G9 now receives positive potential at both inputs a further 90° shift will take place in the phase of the output signal *i*.

In the event the first 1 is followed by a second 1 to form a 11 dibit, the operation would generally be the same but in this case upon receipt of the second pulse at P ground potential from line 0 would remain on gate G1 and the flip-flop circuit K2 would be again flipped but no subsequent flipping of K1 would take place and as a result, a 180° phase shift would take place as a result of the respective conditions of K3 and K4.

Figures 4, 5:
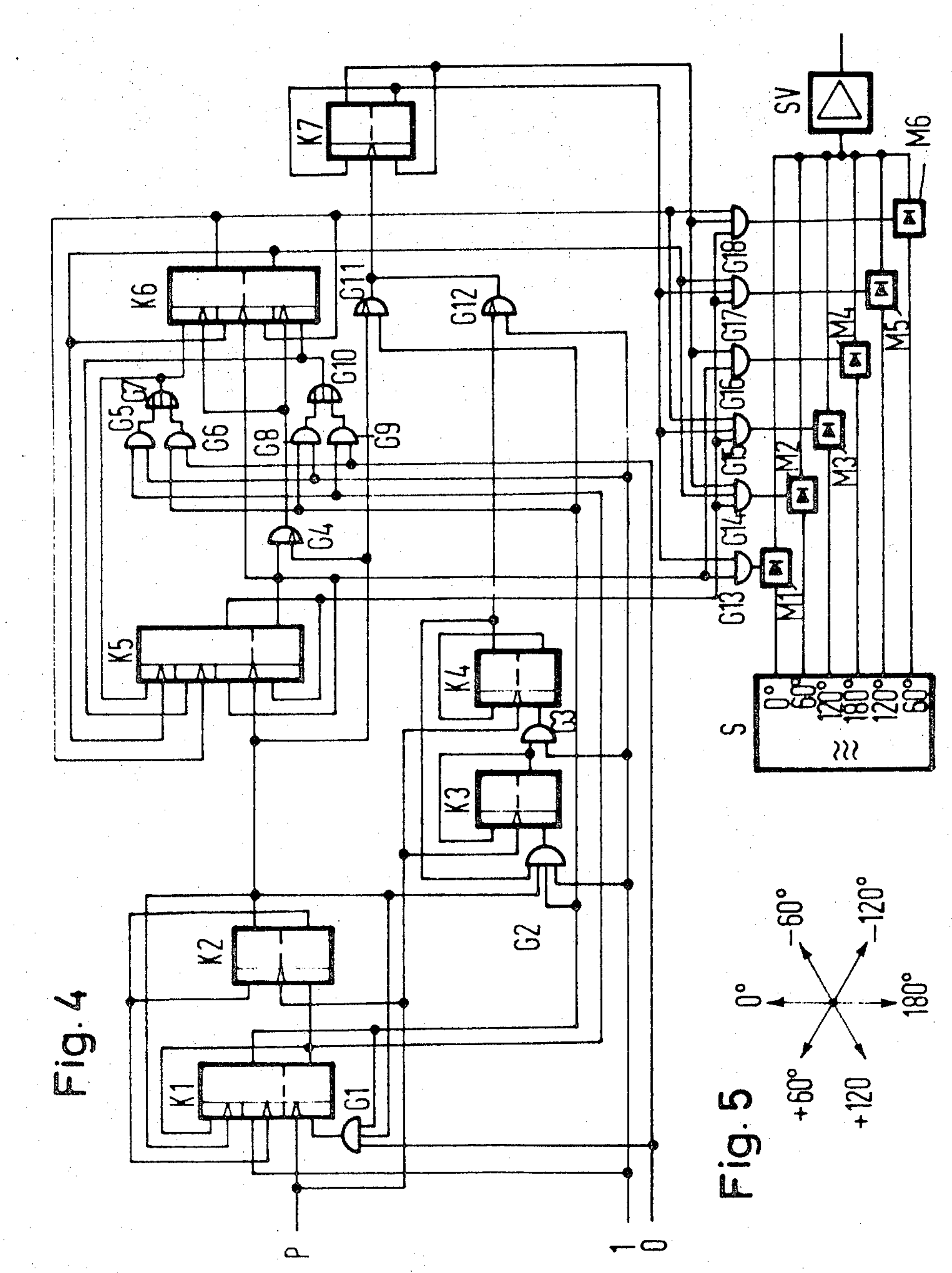
FIG. 4 represents a circuit arrangement, similar to FIG. 1, utilizing senary operation.
FIG. 5 represents a phase diagram for senary operation in the circuit of FIG. 4.

FIG. 4 illustrates a transmitting apparatus for the senary process, which is constructed fundamentally in the same manner as the quaternary transmitting apparatus. Corresponding to the higher coding form, however, the circuit components are extended. The pulse P is externally supplied in the step rhythm of the binary signal to be transmitted (line *a* in FIG. 6) and the binary signal itself (line *b* in FIG. 6) over the lines 1 and 0. The threes-counter, serving for the coverage of all the tribits beginning with 0, consists of the flip-flop circuits K1 and K2. In the middle of the first step (0 step) K1 shifts "down," and one beat period later, K2 follows. If the second step is a 1 step, then K1 at this moment flips back into "up" position. If, however, the second step is a 0 step, K1 then remains in "down" position, and thereby the information of the second step is temporarily stored in K1. In the middle of the third step, K2 and, in case K1 was still in "down" position, also K1, flip back into the rest or "up" position. (Cf. lines *c* and *d* in FIG. 6.) Each positive flank of the flipping process of K2 delivers a pulse (line *g*), which, in the following six-stage forward-backward counter (flip-circuits K5, K6 and K7) releases a counting operation. The magnitude and direction of the counting step is determined, on the one hand, by the information stored in K1 of the second step, and, on the other hand, by the information of the third step of the tribit just present at such moment on the input lines 1 and 0.

Figure 6:
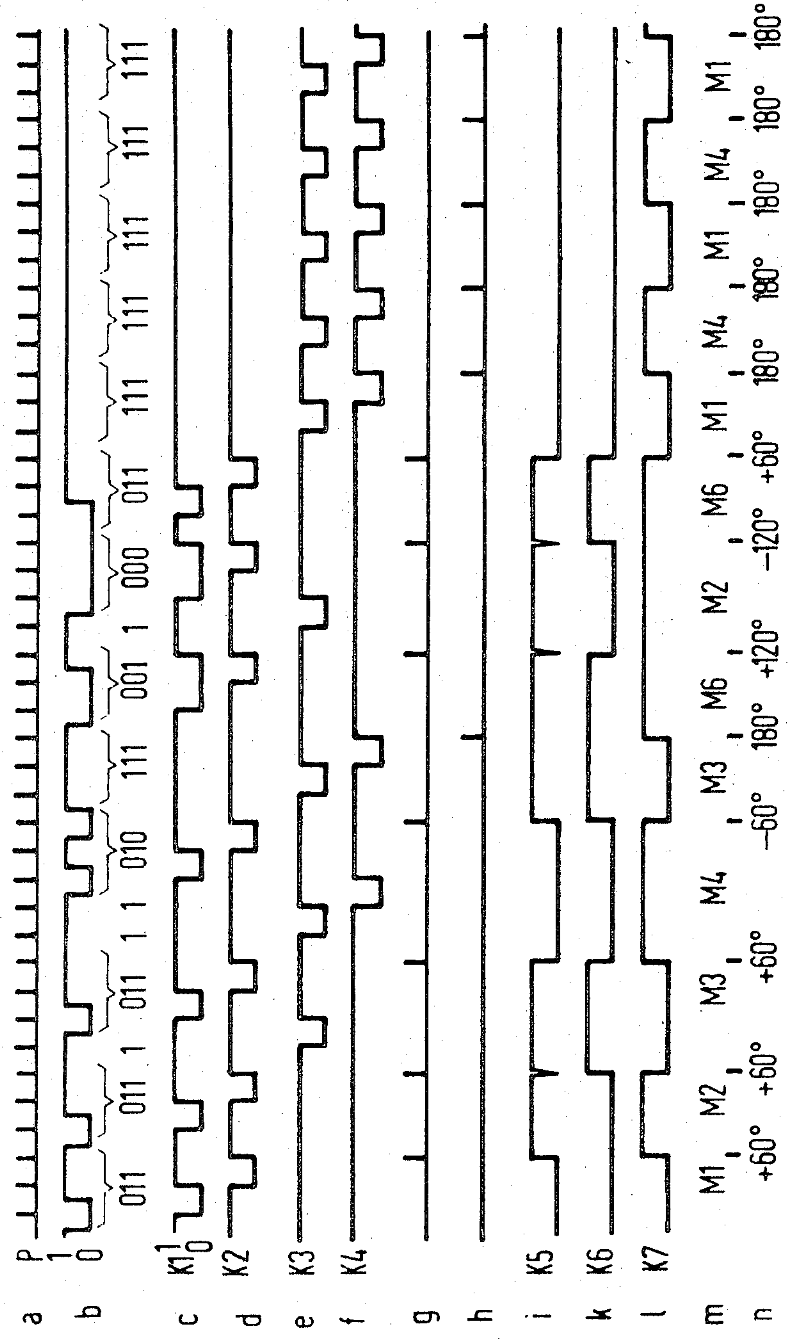
FIG. 6 is a chart, similar to FIG. 3, illustrating the relationships existing in the operation of the circuit of FIG. 4.

The second input threes-counter (K3 and K4) covers the tribits 111. It starts, in each case, on the first 1 step not forming a part of a tribit already covered in which process K3 flips "down." If the following step is an 0 step, K3 returns without further consequence into the rest position "up." If, however, as the second step another 1 step appears, K4 flips to "down," while K3 simultaneously returns to rest position. A further step interval again flips K4 to "up" and in so doing delivers a pulse which, however, is passed through only if a third 1 step is present in the binary signal. The lines *e* and *f* in FIG. 6 illustrate the flipping processes in K3 and K4, and line *h* illustrates the pulses resulting therefrom, which release in the six-stage counter a counting shift by three stages. The outputs of the six-stage counter are formed by the gates G13 to G18, and, if desirable, an amplifier can be additionally connected at the respective output sides thereof. At any moment only one of the six outputs conducts voltage and controls one of the six key modulators M1 to M6 for the passage of one of the six phases of the carrier generator S in accordance with the phase diagram of FIG. 5. The flipping processes occurring on expiration of the binary signal, represented in line *b*, in the six-stage counter are represented in lines *i*, *k* and *l*, in which at the beginning all three flip-flop circuits are arbitrarily assumed to be in the "down" position. Line *m* indicates which of the key modulators in each case is controlled to effect passage of the desired carrier phase and in line *n* there appear the phase shifts occurring in the carrier-frequency signal. The transmitting signal is amplified in accordance with requirements in the transmitting amplifier SV and then supplied to the transmission channel.

Changes may be made within the scope and spirit of the appended claims which define what is believed to be new and desired to have protected by Letters Patent.

I claim:

1. A method for transmission of a binary information signal comprising sequential digital signal steps, each step consisting of a binary state, 0 or 1, one of which states represents a steady modulation condition of the binary information signal, by multistage phase modulation utilizing a plurality of determinate phase shifts of a carrier frequency, comprising the steps of effecting a joint transmission of a binary sequence of $n$ number, $n$ being an integer greater than 1, of signal steps of a binary information signal as a group by one of said determinate phase shifts, the particular determinate phase shift selected in dependence upon the respective binary states of the $n$ steps of a group involved in a joint transmission, and utilizing for the transmission of the groups of binary information signals only the absolutely necessary number of $2^n-1$ determinate phase shifts, utilizing an additional phase shift to transmit, as a group, the fixed number of $n$ signal steps of said binary state representing such steady modulation condition of the binary information signal, and transmitting any signal steps which number less than $n$, separating two successive groups, without a change in phase, 0° phase shift, as a continuation of the immediately preceding phase shift position.

2. A method according to claim 1, wherein $n$=2 and transmission is effected by quaternary phase modulation, in which information comprising a first binary sequence containing unlike signal steps, is transmitted by a first predetermined phase shift, a second binary sequence containing like signal steps of one binary state, are transmitted by a second predetermined phase shift, a third binary sequence, containing like signal steps of the other binary state, is transmitted by a third predetermined phase shift, and signal steps, occurring singly between two such successive binary sequences are transmitted as a continuation of the immediately preceding phase position.

3. A method according to claim 2, wherein information comprising the binary sequence of 01 is transmitted by a phase shift of 90° in one direction, information comprising the binary sequence 00 by a phase shift of 90° in the opposite direction and information comprising the binary sequence 11 by a phase shift of 180°, while the binary step 1 occurring only singly between two successive binary sequences is transmitted as a continuation of the immediately preceding phase position.

4. A method according to claim 1, wherein $n=3$ and transmission is effected by senary phase modulation, in which information comprising a first binary sequence, containing two like signal steps of one binary state followed by one signal step of the other binary state, is transmitted by a first predetermined phase shift, a second binary sequence, containing one signal step of one binary state followed by two signal steps of the other binary state, is transmitted by a second predetermined phase shift, a third binary sequence, containing two like signal steps of one binary state separated by a signal step of the other binary state, is transmitted by a third predetermined phase shift, a fourth binary sequence, containing like signal elements of one binary state, is transmitted by a fourth predetermined phase shift, a fifth binary sequence, containing like signal elements of the other binary state is transmitted by a fifth predetermined phase shift, and signal steps occurring singly or doubly between two successive binary sequences are transmitted as a continuation of the immediately preceding phase position.

5. A method according to claim 4, in which information comprising the binary sequences of 011 and 010 are transmitted by respective phase shifts of +60° and −60°, information comprising the binary sequences 001 and 000 are transmitted by respective phase shifts of +120° and −120°, and information comprising the binary sequence 111 by a phase shift of 180°, while the binary step 1 and the binary sequence 11 occurring between successive sequences of said first mentioned binary sequences are transmitted as a continuation of the immediately preceding phase shift position.

6. A circuit arrangement for transmitting a binary information signal comprising sequential digital signal steps in the form of binary states 0 or 1, one of which signal states represents a steady modulation condition of the binary information signal, by multistage phase modulation in groups of $n$ signal steps, $n$ being an integer greater than 1, comprising a carrier frequency generator, which is operative to provide the carrier oscillation in a plurality of different phase shift positions, preferably uniformly spaced with respect to one another, evaluation means responsive to the signal steps and having an input for receiving timing pulses at the same frequency as that of the signal steps, said evaluation means comprising a first counter constructed to count $n$ number of steps, in which the first step is of one binary state, a second counter constructed to count $n$ number of steps in which the first step is of the other binary state, and a forward-backward counter having $2n$ number of stages operatively connected and responsive to said first and second counters, said arrangement having an output from which phase-modulated signals are to be transmitted, and control means connected to said forward-backward counter for each phase position for operatively connecting the desired phase of the carrier frequency generator to said output and respectively responsive to different groups of binary states, as determined in said forward-backward counter, said carrier frequency generator providing $2^{n}-1$ phase shift positions for the transmission of the binary information signal, and an additional phase shift position for the transmission of $n$ steps of the steady modulation condition of the binary information signal, no signal being passed from said first two counters in the presence of any signal steps of the binary state representing such steady modulation condition, which number less than $n$, separating two successive groups, whereby the immediately preceding phase shift position, 0° phase position, is retained.

7. A circuit arrangement according to claim 6, wherein $n=2$, and said carrier frequency generator is operated to provide four different phase shift positions, said first and second counters each being constructed to count two signal steps, with one such counter being operable to count like steps of one binary state, operative to actuate said forward-backward counter to effect a predetermined phase shift, the other of such counters being operable to count groups beginning with a step of the other binary state, followed by a step of either binary state, operative to actuate said forward-backward counter to effect respective different phase shifts, signal steps of said one binary state occurring only singly between two successive groups being inoperative to effect actuation of said forward-backward counter whereby no phase shift, a 0° phase position, is effected thereby.

8. A circuit arrangement according to claim 7, wherein said carrier frequency generator is operative to provide four different phase shift positions, spaced by 90°, said control means being so constructed that a group comprising unlike signal steps is operative to effect a phase shift of 90° in one direction, a group comprising like signal steps of one binary state is operative to effect a phase shift of 90° in the opposite direction, and a group comprising like signal steps of the other binary state is operative to effect a phase shift of 180°.

9. A circuit arrangement according to claim 8, wherein said control means is so constructed that a group comprising signal steps of 01 is operative to effect a phase shift of +90°, a group comprising signal steps of 00 is operative to effect a phase shift of −90°, a group comprising signal steps of 11 is operative to effect a phase shift of 180°, and a signal step of 1 occurring only singly between said two successive groups is operative to effect no phase shift, 0° phase position.

10. A circuit arrangement according to claim 8, wherein each of said first and second counters comprises a bistable flip-flop stage, each bistable flip-flop stage being capable of being controlled in two stable positions respectively designated rest position and a working position, each bistable flip-flop stage having a timing input and being switched over between the two stable positions through timing pulses, applied to the timing input thereof, which occur at the step center of the binary information steps to be transmitted so that each of said bistable flip-flop stages operates as a frequency divider with a divider relation of 2:1, the switchover of one stage from the rest position into the working position being possible only in the case of a 0 first step of the binary information signals to be transmitted, and the switchover of the other stage from the rest position into the working position being possible only in the case of a 1 first step of the binary information signals to be transmitted, said forward-backward counter comprising two bistable flip-flop stages and cooperable gate circuits which are connected in a ring, said counter having four counting positions and each counting position having an output line connected with respective control means operative to effect a connection of a corresponding phase position, 0°, 90°, 180° or 270°, of the carrier frequency generator, the forward-backward counter having its input connected to the bistable flip-flop stage of one of said two other counters whereby the forward-backward counter is actuated, in accordance with the particular binary state of the steps involved to effect a phase shift of 90° in forward or backward direction, and the bistable flip-flop stage of the remaining of said other two counters is operative to effect said phase shift of 180°.

11. A circuit arrangement according to claim 6, wherein $n=3$, and said carrier frequency generator is operated to provide six different predetermined phase positions, said first and second counters being so constructed that a group comprising like signal steps of one binary state is operative to actuate said forward-backward counter to effect one of said predetermined phase shifts, groups beginning with a step of such one binary state, followed by steps of either binary state are operative to actuate said forward-backward counter to effect respective different predetermined phase shifts, and a group comprising like signal steps of the other binary state is operative to actuate said forward-backward counter to effect still a different phase shift, said signal steps of said other binary state occurring only singly or doubly between two successive groups being inoperative to effect actuation of said forward-backward counter whereby no phase shift, a 0° phase position, is effected thereby.

12. A circuit arrangement according to claim 11, wherein said carrier frequency generator is operative to provide six different phase positions, said first counter being so constructed that a group comprising signal steps of 001 is operative to actuate said forward-backward counter to effect a phase shift of +60°, a group comprising signal steps of 010 is operative to actuate said forward-backward counter to effect a phase shift of −60°, a group comprising signal steps of 001 is operative to actuate said forward-backward counter to effect a phase shift of +120°, a group comprising signal steps of 000 is operative to actuate said forward-backward counter to effect a phase shift of −120°, a group comprising signal steps of 111 is operative to actuate said forward-backward counter to effect a phase shift of 180°, signal steps of 1 occurring only singly or doubly between two successive groups being inoperative to effect actuation of said forward-backward counter, whereby no phase shift, a 0° phase position is effected thereby.

13. A circuit arrangement according to claim 12, wherein the first and second counters each comprise bistable flip-flop stages forming respective threes-counters which are switched over, between a rest position and a working position, by such timing pulses which occur at the step centers of binary information to be transmitted, in which one threes-counter always begins to count on occurrence of an 0 step, while the other threes-counter ascertains a tribit with three 1 steps, said forward-backward counter being operatively connected to the respective threes-counters and actuated in the one or the other direction by the switching over of the first of said threes-counters, when the first step of a binary information group to be transmitted is a 0, in dependence upon the respective binary states of the remaining signal steps of such group, and actuated by the switching over of the second of said threes-counters when each signal step of a group to be transmitted is a 1, said control means being operable responsive to each of the six counting positions for connecting a respective one of the six phase positions of said carrier frequency generator to said output.